March 17, 1936.  M. SCHLUMBERGER  2,034,447
METHOD FOR ELECTRICALLY PROSPECTING THE UNDERSOIL
Filed Nov. 9, 1934
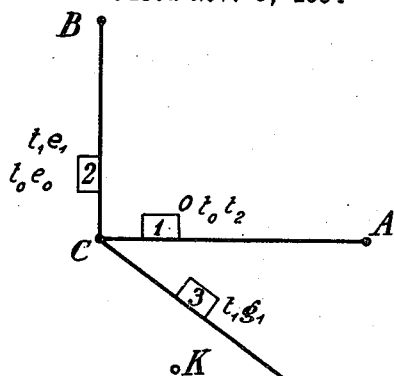
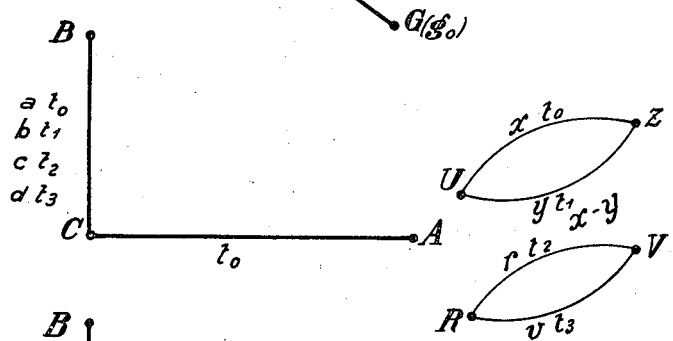
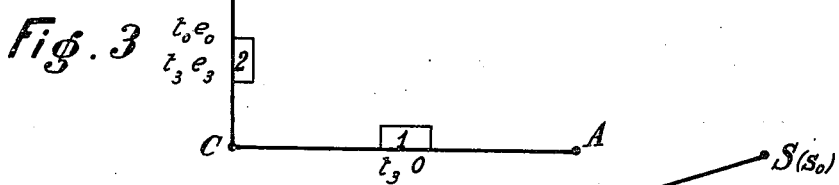
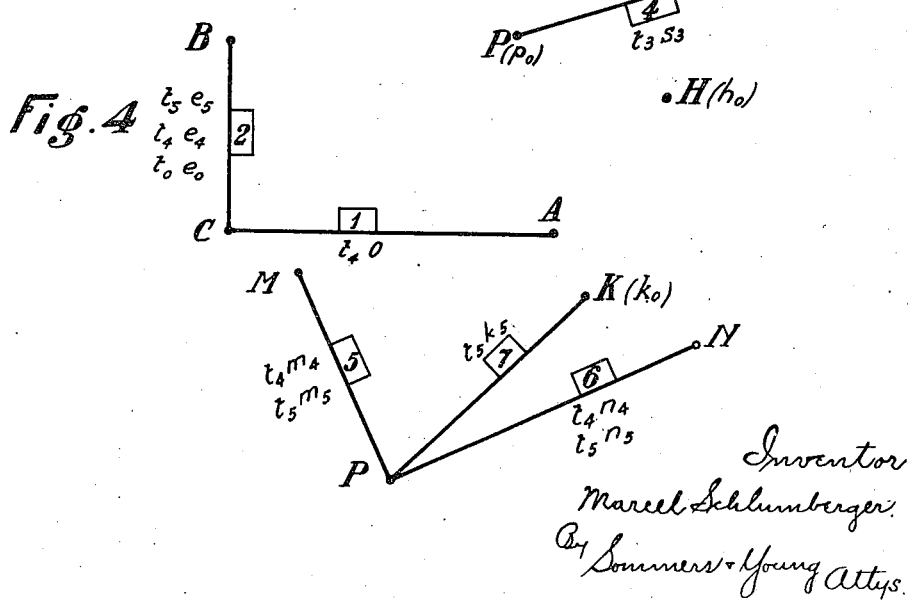

Patented Mar. 17, 1936

2,034,447

UNITED STATES PATENT OFFICE 2,034,447

METHOD FOR ELECTRICALLY PROSPECTING THE UNDERSOIL

Marcel Schlumberger, Paris, France, assignor to Compagnie Generale De Geophysique, Paris, France, a corporation of France Application November 9, 1934, Serial No. 752,322
In France January 8, 1934

11 Claims. (Cl. 175—182)

The present invention relates to methods for electrically prospecting the undersoil.

It is known that, at the present time, valuable information on the nature of the undersoil in a given area can be obtained by means of electrical measurements made on the surface of the ground in and around said area. One of the known methods essentially consists in producing in the ground, through two suitable ground connections or electrodes, an electric current of known intensity, produced by any suitable source, and in measuring, by means of any suitable device, for instance a potentiometer, the difference of potential produced between two points on the surface of the ground by the passage of this current. By making a great number of measurements of this kind, in which the positions of the ground electrodes and the intensity of the current sent into the ground are kept constant, it is possible to measure the differences of potential between the different points of the surface of the ground, that is to say to draft a kind of "chart of the potentials", on which, for instance, the equipotential curves may be plotted, with the indication for each of them of the value of its potential with reference to that of a fixed point which is considered as having a potential equal to zero. By means of said chart it is possible to deduce the probable nature of the undersoil through theoretical as well as experimental considerations.

Other similar methods are also employed. They all include, as a common characteristic feature, the step of emitting currents of any value into the ground at places chosen by the experimenter. This fact involves a very serious drawback, to wit, the lack of precision of the results thus obtained. It is known that currents called "telluric currents" flow normally and permanently in the ground. These currents are generally of low intensity but their intensity and their direction vary constantly as a function of the time. These currents therefore product differences of potential which are added to those caused by the currents emitted in the ground for the experiments above explained. Between two successive measurements, these additional differences of potential vary for the reasons above stated (variation of the direction and of the intensity of the telluric currents) and this introduces a cause of error in the measurements.

It has been endeavoured to reduce the importance of this cause of error by making use, for the experiments, of a main current of high intensity, which reduces the relative value of the error above mentioned, or by making use of a periodic main current which is but little influenced by currents having another period. It is obvious that these methods make it possible to very much reduce the cause of error above mentioned but cannot entirely do away with it.

The object of the present invention is to provide a method which fully obviates this drawback.

The principle of the present invention consists in making use, for the measurements to be made on the surface of the ground (from which measurements the probable nature of the ground can be deduced through any known or other method), of the differences of potential produced by the telluric currents themselves without adding thereto arbitrary currents sent through the ground for this purpose by the experimenter. This method therefore does away with the use of ground electrodes, sources of current, electric connections between the electrodes, and so on.

The method according to the present invention is based on the following experimental facts, which may now be considered as well established:

It has been found that the intensities and the directions of the telluric currents vary constantly as a function of time, but that, at a given time, these currents have substantially the same average direction in an area of several thousands of kilometers in all directions, account having of course to be taken of the differences of resistivity of the undersoil in the area that is considered. In other words, at a given time, everything takes place, within a determined area, as if the telluric currents were artificial currents created in the ground by two grounded electrodes located at a very great distance on either side of the area that is considered, in the mean direction of these currents, between which grounded electrodes a suitable difference of potential would exist. The laws of variation of the direction and intensity of the telluric currents as a function of time are not well known but this does not matter at all from the point of view of the present invention.

From these facts, it may be deduced that if, at two different times, the telluric currents have the same mean direction in a given area, the respective distributions of potential at said times, both on the surface and on the inside of the ground, can be superposed to each other, that is to say are similar, the ratio of the respective values of the current at any point at these times being the same for all points.

Of course, these results might be utilized directly by measuring simultaneously, by means of a great number of apparatuses, the differences of potential produced at a given instant by the telluric currents, which would make it possible to establish the chart of the potentials at this time. But this method, which is within the scope of the present invention, is difficult to carry out because it requires a great number of apparatuses and of experimenters (or of recording apparatus).

On the other hand it is clear that measurements made at different times cannot be directly compared between them, because, at these different times, the direction and the intensity of the telluric currents have changed. The present invention also concerns a method permitting to draft a "chart of potentials" by means of measurements made at different times.

Several manners of carrying out the method according to the present invention will be hereinafter described, with reference to the accompanying drawing, given merely by way of example.

Figs. 1 to 4 are diagrams illustrating the method according to the present invention.

According to the present invention, three stations A, B, C are established on the area to be prospected (Fig. 1). Preferably these stations are so located that lines CA and CB are at right angles to each other. The differences of potential between stations C and A on the one hand and C and B on the other hand are continuously observed. These differences of potential will be designated by reference characters $E_{CA}$ and $E_{CB}$. The time $T_0$ at which $E_{CA}$ is equal to zero is carefully noted. At this time, the value of $E_{CB}$ is equal to $e_0$. The time $T_1$ at which $E_{CA}$ again becomes equal to zero is noted. The value of $E_{CB}$ is then $e_1$. It is quite clear that at the times when $E_{CA}$ is equal to zero, that is to say at the times $T_0$, $T_1$, $T_2$, . . ., the mean direction of the telluric currents is at right angles to line CA. In other words, at these various respective times the telluric currents have the same mean direction and therefore the "charts of potential" that result therefrom are similar and the differences of potential that they produce are proportional to values $e_0$, $e_1$, $e_2$, etc. Therefore it suffices to make the measurements at times $T_0$, $T_1$, $T_2$, etc., between different pairs of points for obtaining differences of potential which can be compared together, account being of course taken of the different factors $e_0$, $e_1$, $e_2$, etc., as in the case of a current emitted in the ground by means of two grounded electrodes in the absence of telluric currents.

By way of example, a specific method of measurement according to the present invention will be hereinafter described with reference to Fig. 1.

An experimenter present at C observes both potentiometer 1, which is inserted between C and A, and potentiometer 2, which is inserted between C and B. At time $t_0$, potentiometer 1 reads zero and potentiometer 2 indicates a difference of potential equal to $e_0$. A potentiometer 3 is then placed between point C and point G and potentiometers 1, 2 and 3 are observed. At a given time (time $t_1$), potentiometer 1 reads zero and potentiometer 3 reads $g_1$, while potentiometer 2 reads $e_1$. In order to trace the "chart of potentials" at a given time (for instance $t_0$) it is necessary to know the value of the difference of the potentials between C and G at this time, which will be designated by $g_0$.

Now, as the nature of the ground has not changed and the distributions of current at times $t_0$ and $t_1$ are identical, the following equation may be written:

$$\frac{e_0}{e_1} = \frac{g_0}{g_1}$$

and consequently $g_0$ is equal to $$g_1 \times \frac{e_0}{e_1}$$

It will therefore be possible to mark, adjacent to point G, the value $g_0$ thus obtained.

Let it be supposed, now, that the potential $p_0$, determined as above explained, of a point P is known and that it is desired to make use of this point P (which is located at a sufficiently great distance from point C) as of a new center for measurements.

The following law will be applied:

An instantaneous sheet of telluric currents has not necessarily, at a given time, the same direction at all the points of the surface of the ground, but if two sheets, or systems of currents, considered at different times respectively, have the same direction at a given station, they also have the same direction at any other station provided that there is no industrial electric apparatus in service in, or close to, the area considered.

Let it be supposed that it is desired to measure the difference of potential between a point S, (Fig. 3) located relatively close to P and at a great distance from C, and said point C. A potentiometer 4 will be placed between P and S and the difference of potential $s_3$ between P and S at the time $t_3$ at which the difference of potential between C and A is equal to zero will be noted. Calling $s_0$ the potentiometric index corresponding to point S, that is to say its potential with respect to point C, at time $t_0$, the following equation is obtained:

$$\frac{s_0 - p_0}{s_3} = \frac{e_0}{e_3}$$

which permits the value of $s_0$ to be obtained.

The same method will serve to obtain the potentiometric index $h_0$ corresponding to another point having any position whatever with respect to point P.

This method requires that the indication given by the potentiometer placed on the base of measurement starting from point P should be read at the very time at which the value indicated by potentiometer 1 is equal to zero. This may be obtained, either by connecting points C and P by a signaling device (for instance an electric one) in such manner as to signal to the experimenter present at point P the exact time at which the value indicated by potentiometer 1 is zero. One might also place at 4 a recording potentiometer connected with station C by an electric signal which will trace a mark on the record of potentiometer 4 exactly when the value indicated by potentiometer 1 is zero.

It is also possible to make use, at 1, 2, and 4, of recording potentiometers tracing their diagrams on the same band of paper, which makes it possible to read on said band the values indicated by potentiometers 4 and 2 when potentiometer 1 indicates value zero. If, for some reason, the communication between stations P and C is difficult to establish or cannot be maintained for a sufficiently long time for permitting to make several measurements about point P, the following method will be employed.

According to this method, which is illustrated by Fig. 4, two lines of measurement PM and PN at right angles to each other and making any angle whatever with CA and CB respectively, are provided from point P. At a time $t_4$, at which the difference of potential between C and A becomes equal to zero, the difference of potential $e_4$ between points C and B is measured by means of potentiometer 2. The difference of potential $m_4$ between P and M is simultaneously measured by means of potentiometer 5, while the difference of potential $n_4$ between P and N is measured at the same time by means of potentiometer 6.

According to the law above set forth, every time the differences of potential between P and M, on the one hand, and P and N, on the other hand have values the ratio of which is equal to $$\frac{m_4}{n_4}$$

the telluric currents reassume at all points the same direction as they had before. In particular, at time $t_0$, these currents had the same direction as at time $t_4$.

Once the values $m_4$ and $n_4$ have been measured at time $t_4$, at which the difference of potential between A and C is equal to zero, it becomes no longer necessary to take station C into account. It will suffice, in order to know the potentiometric index of a point K, to dispose between P and K a potentiometer 7 and to read the value indicated by this potentiometer, say $k_5$, at time $t_5$, at which the values $m_5$ and $n_5$ indicated by potentiometers 5 and 6 will be such that:

$$\frac{m_5}{n_5} = \frac{m_4}{n_4}$$

We have the following equations:

$$\frac{m_0}{n_0} = \frac{m_4}{n_4} = \frac{m_5}{n_5} \text{ etc.}$$

On the other hand:

$$\frac{k_0 - p_0}{k_5} = \frac{m_0}{m_5} = \frac{m_4 e_0}{m_5 e_4}$$

and therefore:

$$k_0 - p_0 = e_0 \frac{m_4 \, k_5}{e_4 \, m_5}$$

The values of $e_0$, $m_4$, $e_4$, and $p_0$ are known, once and for all, by the measurements made, as well at C as at P. Calling C a constant factor equal to $$\frac{e_0 m_4}{e_4}$$

we have:

$$k_0 - p_0 = C \frac{k_5}{m_5}$$

and the value of $k_0$ is obtained by means of three simultaneous measurements made on lines PM and PN and between P and K.

It will be seen that this method avoids the drawbacks resulting from the variability of the intensity and the direction of the telluric currents and that it makes it possible to make the measurements with a relatively small number of apparatus (three being sufficient).

Of course, it would be possible, instead of choosing the times $T_0 T_1$, $T_2$, etc. at which $E_{CA}$ becomes equal to zero, to consider the times $T_0'$, $T_1'$, $T_2'$, etc. at which the ratio $$\frac{E_{CA}}{E_{CB}}$$

becomes equal to a given value $k$, since at these times the direction of the telluric currents is obviously the same. Furthermore, it will be noted that this is true whatever be the nature of the undersoil under lines CA and CB.

The method above described has a small drawback due to the fact that the electrodes that are employed for measuring the differences of potential between two points of the ground are not fully impolarizable. It follows that parasitic differences of potential of small value are introduced in these measurements. In order to wholly eliminate this effect, it is advantageous to utilize the following modification of the method above described, which modification is based on the fact that the polarization electromotive forces vary very little as a function of the time.

Use is made of lines or bases CA and CB (Fig. 2) as in the preceding example and the times $t_0$, $t_1$ at which the difference of potential between C and A becomes equal to a given value (which may be zero or any other value) are noted. The difference of potential between two points U and Z at time $t_0$ is measured; this difference of potential is $x$. The difference of potential between points U and Z is measured at time $t_1$; this difference of potential is $y$. Also the differences of potential between C and B at these times have been measured, the values of this difference of potential being $a$ at time $t_0$ and $b$ at time $t_1$. In view of the principle that the states of equilibrium can be superposed, a difference of potential between U and Z equal to $x - y$ would be produced by a system of telluric currents such as one might call a "differential" system of telluric currents, that is to say a system in which the intensity of the current at every point is the geometrical difference of the intensities, at this point, of the currents of two real systems at times $t_0$ and $t_1$. This differential system of currents is therefore such that at point C the component of the current in direction CA is zero, that is to say the current is at right angles to CA. On the other hand, it will be readily understood that, in difference $x - y$, the electromotive forces of contact due to polarization of the electrodes are eliminated.

It will be possible, in a like manner, to measure the difference of potential between two other points R and V, at other times $t_2$, $t_3$ at which the difference of potential between C and A becomes equal to the value precedingly chosen. These two differences of potential are $r$ and $v$ respectively, while the differences of potential between C and B at times $t_2$ and $t_3$ are $c$ and $d$ respectively.

In order to be able to compare the differences of potential found between R and V on the one hand and between U and Z on the other hand, it will be noted that ratio $$\frac{x - y}{a - b}$$

is constant and independent of the times $t_0$ and $t_1$ at which the measurements have been made provided that these times correspond to the same value of the difference of potential between C and A. This is true for any groups of points.

It will therefore suffice, in order to draft the chart of potentials, to consider the ratios:

$$\frac{x - y}{a - b}, \quad \frac{r - v}{c - d}$$

Obviously, the methods above described, which make it possible to measure the differences of potential on the surface of the ground by means of the telluric currents, without making use of any other electric current, are wholly independent of the methods, either known or not, for making use of the data thus obtained with a view to studying the probable nature of the undersoil.

I will merely indicate, by way of example, one of these methods of utilizing the results obtained, which is known as the "chart of resistivities" method. This method consists in measuring the differences of potential between couples of points located at a determined (generally small) distance from each other, said distance being of course the same for all the couples of points. These measurements give the value of the resistivity of the undersoil between the two points in the direction of the line that joins them. By making these measurements for a great number of couples of points located all on the same line, a "profile of the resistivities" is obtained which gives very useful informations.

In an area in which the direction of stratification of the ground is known, at least roughly, it is preferable to make the measurements when the mean direction of the telluric currents is at right angles to this direction of stratification because the differences of resistivity in the undersoil are thus better brought into light. If this direction of stratification is wholly unknown, it is advantageous to make two series of measurements with telluric currents the respective mean directions of which are at right angles to each other, because one of the charts thus obtained is sure to give clear indications on these differences of resistivity.

On the other hand, it should be well understood that by the expression "telluric currents" I mean not only the telluric currents proper but also the stray currents that are produced in the soil by different causes, for instance industrial ones, provided that these currents come from and return to sources located at a considerable distance from the area to be studied, this excluding currents emitted in the ground especially for studying the differences of potential therein, which last mentioned currents had always been considered as necessary up to now.

It is again pointed out that the method according to the present invention makes it possible to dispense with electrodes buried in the ground, sources of current, and especially connections between the electrodes in the ground, which necessitate a considerable work for establishing them, administrative authorizations, and a permanent supervision of these electric lines as long as the experiments are not terminated. The present invention only calls for contact electrodes and relatively short electric lines for connecting together the points between which the differences of potential are to be measured. For practical purposes, this is a very great advantage.

What I claim is:

1. A method of electrically prospecting the undersoil which comprises measuring the differences of potential produced by telluric currents between any two points of the surface of the ground, at times when the telluric currents have a given direction, making similar measurements at the same times between two points of said surface chosen for comparison, and comparing the first measurements with the measurements between these two last mentioned points.

2. A method of electrically prospecting the undersoil in a given ground area, which comprises observing the difference of potential between two points of said ground area, noting the times at which this difference of potential becomes zero, measuring the differences of potential produced by telluric currents between any two points of the ground at these times, making similar measurements simultaneously between two points of said ground area located along a line at right angles to the line passing through the two first mentioned points, and comparing the first mentioned measurements with the measurements made simultaneously between these two last mentioned points.

3. A method according to claim 2 in which all the measurements of differences of potential are made twice successively, but still at the times above mentioned, the values that are compared being the differences between the two successive potential differences measured between each pair of points.

4. A method according to claim 1 in which the differences of potential are measured at times at which the mean direction of the telluric currents is at right angles to the direction of stratification in this ground area.

5. A method according to claim 2 in which the two first mentioned points are located along a line substantially parallel to the direction of stratification in this ground area.

6. A method of electrically prospecting the undersoil which comprises performing twice the series of operations stated in claim 1, the directions chosen for these two series of operations being at right angles to each other, respectively.

7. A method of electrically prospecting the undersoil in a given ground area, which comprises measuring the differences of potential produced by telluric currents between any two points of said ground area located on a line parallel to a given direction at the successive times at which the telluric currents have a given direction, making similar measurements at the same times between two points of said ground area located on a line parallel to the first mentioned direction, these two last mentioned points being chosen for comparison, and comparing the first mentioned measurements with the measurements made between these two points of comparison.

8. A method of electrically prospecting the undersoil in a given ground area, which comprises observing the difference of potential at a station of comparison chosen in said area between two points of the ground located on a line at right angles to a given direction, noting the times at which this difference of potential becomes zero, measuring the differences of potential produced by telluric currents between couples of points of the ground located on respective lines parallel to this direction at these times, making similar measurements simultaneously at the station of comparison between two points located along a line parallel to this direction, and comparing the first mentioned measurements with the measurements made simultaneously between these two last mentioned points at the station of comparison.

9. A method of according to claim 8 in which all the measurements of differences of potential are made twice successively, at times when the differences of potential betwen the two first mentioned points are the same, the values that are compared being the differences between the two successive measurements made for each couple of points.

10. A method according to claim 7 in which the measurements are made when the mean direction of the telluric currents is at right angles to the direction of stratification in this ground area.

11. A method of electrically prospecting the undersoil which comprises performing twice the series of operations stated in claim 7, the directions chosen for these two series of operations being at right angles to each other, respectively.

MARCEL SCHLUMBERGER.